Inventor
ROBERT H. LILLYBLAD
CLAUDE L. ROBINSON
Caswell & Lagaard
Attorney

Inventor
ROBERT H. LILLYBLAD
CLAUDE L. ROBINSON
By Caswell & Lagaard
Attorney

June 5, 1951 R. H. LILLYBLAD ET AL 2,555,697
BREAD TOASTER
Filed Oct. 18, 1946 5 Sheets-Sheet 5

Inventor
ROBERT H. LILLYBLAD
CLAUDE L. ROBINSON
By Caswell & Lagaard
Attorney

Patented June 5, 1951

2,555,697

UNITED STATES PATENT OFFICE 2,555,697

BREAD TOASTER

Robert H. Lillyblad and Claude L. Robinson,
Grand Haven, Mich.

Application October 18, 1946, Serial No. 704,230

8 Claims. (Cl. 99—391)

1

Our invention relates to electric bread toasters of the type in which the bread is supported on a rack which is depressed into a case by means of a finger piece when the toaster is brought into operation.

An object of the invention resides in providing finger pieces at each end of the case together with mechanism by means of which the rack may be depressed into the case by operation of either of said finger pieces.

Another object of the invention resides in providing mechanism extending between the ends of the toaster for operatively connecting the finger pieces with the bread rack.

An object of the invention resides in providing a straight line motion between the two ends of the bread rack and for causing the bread rack to travel in a vertical direction.

Another object of the invention resides in providing levers at the ends of the toaster case, said finger pieces being connected to an arm of each of said levers and to further provide linkage connected to the other arms of said levers and to said straight line motion.

Another object of the invention resides in connecting the operating arms of said levers to an arm of said straight line motion.

A feature of the invention resides in providing a link operating between said levers for causing said levers to move in unison.

An object of the invention resides in providing a torsional spring connected to said straight line motion and serving to operate the same to elevate the bread rack.

Other objects of the invention reside in the novel combination and arrangement of parts and in the details of construction hereinafter illustrated and/or described.

2

Figure 1:
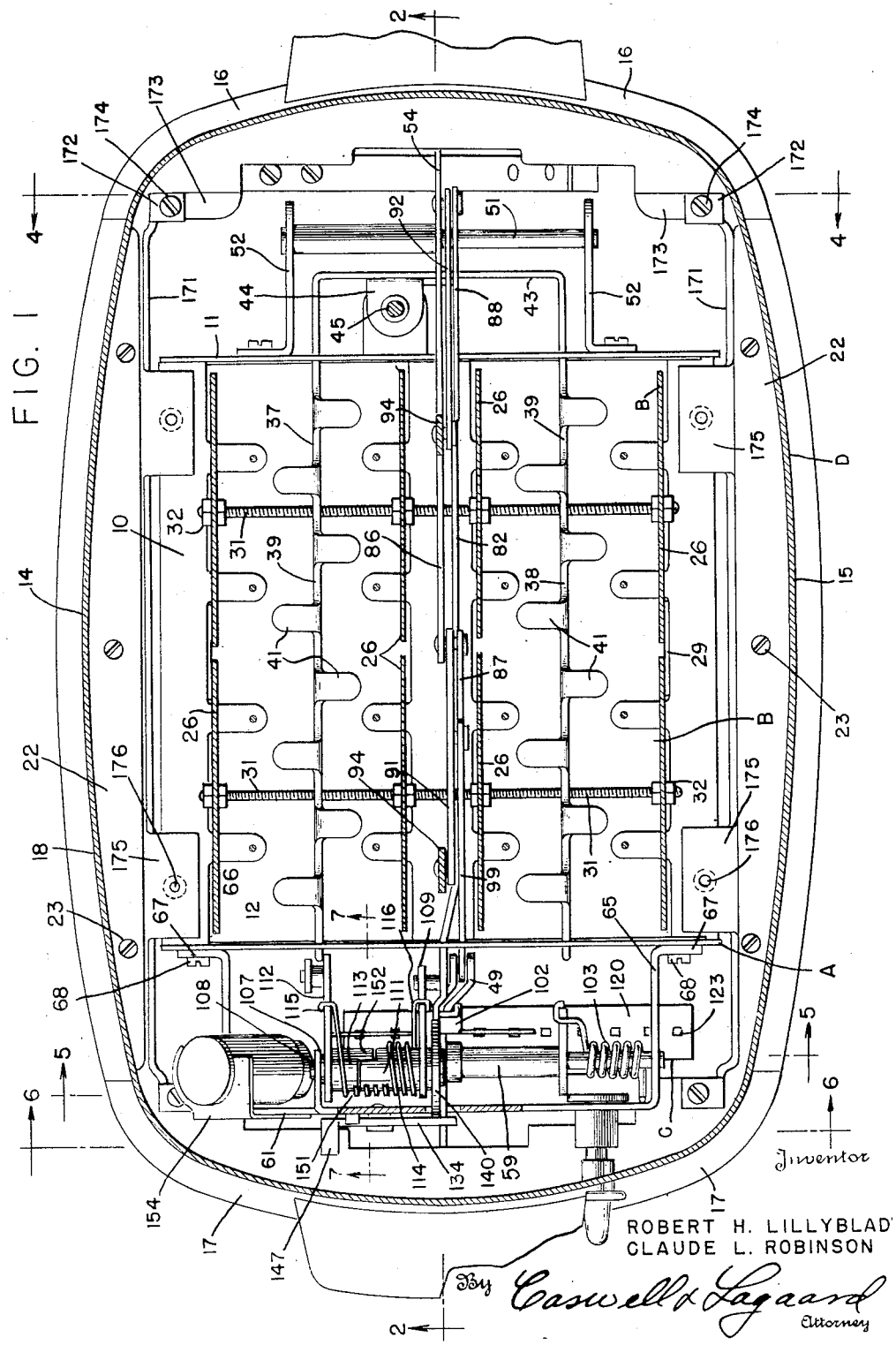
Fig. 1 is a plan sectional view of a bread toaster taken on line 1—1 of Fig. 2 and illustrating an embodiment of our invention.

In the type of electric toaster in which the bread is supported on a bread rack adapted to be depressed to bring the bread into toasting position, an operating finger piece is employed which is located at one end of the toaster and is adapted to be depressed to actuate the toaster. Also, a dummy finger piece is invariably provided at the other end of the toaster which is fixed relative to the toaster case. These two finger pieces serve for carrying the toaster about. The operator, when wishing to actuate the toaster, frequently attempts to depress the stationary finger piece with no results. This means that the toaster probably has to be turned end for end or that the depression of the proper finger piece must be made with the left hand and becomes awkward and inconvenient. The present invention overcomes this disadvantage by providing a mechanism by means of which the toaster may be operated by depression of either of the finger pieces.

For the purpose of illustrating our invention, we have shown in the drawings, an electric toaster similar to that disclosed in the patent to Robert Sardeson, #2,365,909, for Food Cooking Device issued December 26, 1944. Due to the fact that certain of the mechanisms of the instant toaster do not form any particular feature of our invention, the same have not been fully illustrated and described in this application and reference to the said Sardeson patent is to be had for such details.

Figure 2:
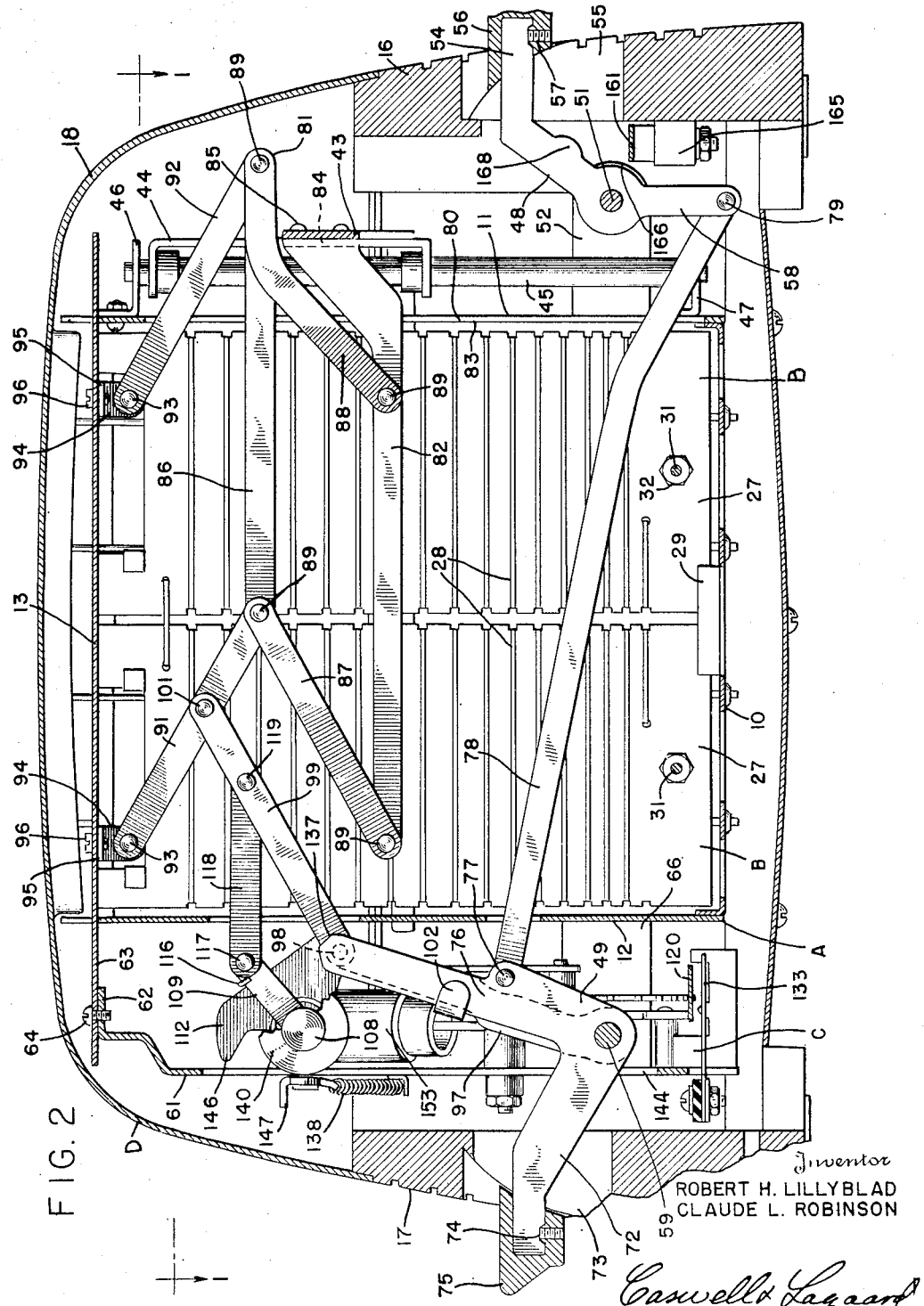
Fig. 2 is an elevational sectional view taken on line 2—2 of Fig. 1.

The electric toaster illustrated comprises a frame A best shown in Figs. 1 and 2. This frame carries within itself, a toaster B and at the outside portion of the same, a timing mechanism C for timing and controlling the operation of the toaster. These various parts will now be described in detail.

The frame A is best shown in Fig. 2 and consists of a lower horizontal frame member 10 constructed of sheet metal and two vertical end frame members 11 and 12 attached to the frame member 10. The frame A further includes an upper horizontal frame member 13 which together with the lower frame member 10 connects the frame members 11 and 12 together.

The frame A is contained within a case D which consists of two side members 14 and 15, two end members 16 and 17 and a cap 18. The side members 14 and 15 are constructed of sheet metal and have flanges 19 extending inwardly therefrom. The cap 18 has flanges 22 turned inwardly from the same which are bolted to the flanges 19 by means of bolts 23. The two end case members are constructed of plastic and have attached to them, two supporting bars 171 which have ears 172 bent inwardly therefrom. These ears rest upon projections 173 formed on the end case members 16 and 17 and are secured thereto by means of screws 174. The bars 171 have formed on them flanges 21 which are secured to the side case members 14 and 15 by means of screws 20. The bars 171 also have bent inwardly therefrom, lugs 175 which overlie the marginal portions of the frame member 10 of frame A. Screws 176 hold the said frame attached to these lugs. In this manner, the frame A is attached to the case D and all of the operating mechanism associated therewith supported within said case.

Toaster B is constructed in the following manner: Disposed between the two end frame members 11 and 12 are four heating elements 26. Each of these heating elements is constructed from two sheets of heat-resisting insulating material 27 on which are wound heating coils 28 of resistance wire or ribbon. The sheets of insulating material 27 are supported at their lower ends by means of clips 29 turned up from the lower frame member 10 and which are held in proper spaced relation by means of threaded rods 31 which extend through the same. Nuts 32 screwed on these rods engage the said sheets of insulating material and hold the same in proper relation. These heating elements provide spaces 33 between pairs thereof which form ovens in which the bread to be toasted is inserted. The intermediate heating elements 26 are also separated to form a space 34 therebetween in which certain of the operating parts of the invention are disposed. Cap 18 is constructed with openings 35 in the same which register with the ovens 33 and through which the bread to be toasted may be inserted into the said ovens. The bread, on being inserted in the ovens, is held away from the heating elements by means of guard wires 36 disposed on each side of the openings 35 and attached to the frame members 10 and 13.

The bread to be inserted into the ovens 33 is supported on two bread racks 37 and 38 best shown in Fig. 1. These bread racks consist of bars 39 extending throughout the extent of the frame A which are provided with lugs 41 which project outwardly therefrom and on which the bread rests. The bars 39 extend through slots 42 in the end frame members 11 and 12 and project outwardly beyond the same. The two bars 39 of the bread racks 37 and 38 have connected to them a cross bar 43 which holds the said bread racks in proper spaced relation. This cross bar has attached to it a U-shaped slider 44 which slides upon a vertically extending rod 45. Rod 45 is mounted in two brackets 46 and 47 attached to the end frame member 11. By means of this construction, the two racks are mounted for sliding movement in a vertical direction to permit of lowering the slices of bread into the ovens 33 or ejecting the same therefrom.

For operating the bread racks 37 and 38, two levers 48 and 49 are employed. The lever 48 is secured to a shaft 51 which is rotatably mounted in brackets 52 secured to the end frame member 11 by means of screws 53. The lever 48 has an arm 54 which projects through a slot 55 in the end member 16 of the case D and which is operable therein. This arm has secured to it a finger piece 56 by means of a set screw 57. The said lever 48 also has an arm 58 which extends downwardly therefrom and which serves to operate the bread racks 37 and 38 as will be presently described in detail.

The lever 49 similar to the lever 48, is attached to a shaft 59. This shaft is mounted for rotation in the following manner: Extending parallel to the end frame member 12 is a plate 61 which is spaced therefrom. The plate 61, at its uppermost portion, has a flange 62 bent inwardly therefrom which overlies an extension 63 on the upper frame member 13. A screw 64 extends through this extension and is threaded into the flange 62. This holds the upper end of the plate 61 in position. The lower end of the plate 61 has two legs 65 and 66 bent inwardly therefrom which extend toward the end frame member 12. These legs have flanges 67 extending outwardly therefrom and which overlie the end frame member 12. Screws 68 pass through said flanges and are threaded into the end frame member 12, thus holding the lower end of the plate 61 in position with reference to the end frame member 12. The shaft 59 is journaled in the leg 65 of plate 61 and in a bracket 69 attached to the plate 61 by means of screws 71.

The lever 49 has an arm 72 which projects through a slot 73 in the end member 17 of case D and which is vertically operable therein. This arm has attached to it by means of a set screw 74, a finger piece 75. The lever 49 is formed with another arm 76 which extends upwardly therefrom and which has pivotally connected to it by means of a rivet 77, a link 78. This link extends through the space 34 at the lowermost portion thereof and is connected to the arm 58 of lever 48 by means of a rivet 79. It will be noted that the arm 58 extends downwardly while the arm 76 extends upwardly. This causes corresponding movement in the opposite direction of the two levers 48 and 49. When finger piece 75 is depressed, lever 49 is moved in a counterclockwise direction. This causes movement of the lever 48 in a clockwise direction. Correspondingly, downward movement of the finger piece 56 causes downward movement of finger piece 75.

The bread racks 37 and 38 are operated by means of a straight line motion indicated in its entirety by the reference character 81. This motion includes a rigid arm 82 which extends through a slot 83 in the frame member 11 and which has a flange 84 overlying the cross bar 43 which connects the two bars 48 and 49 of the bread racks 37 and 38 together. Rivets 85 extending through these parts secure the bar 82 rigidly to the bread racks. In addition to the bar 82, a floating link 86 is employed. This link is pivotally connected to the bar 82 by means of two arms 87 and 88 which are pivoted to the said arms by means of rivets 89. Other arms 91 and 92 are pivoted to the floating link 86 by means of the rivets 89 and are also pivoted by means of rivets 93 to brackets 94. These brackets have flanges 95 underlying the upper frame member 13 and are secured thereto by means of screws 96 which extend through said frame member and are threaded into the flanges 95. It will thus be comprehended that a straight line motion is formed for moving the bread racks 37 and 38 whereby the said bread racks may move from the position shown in Fig. 2 and to the position shown in Fig. 3 and vice versa.

Figure 3:
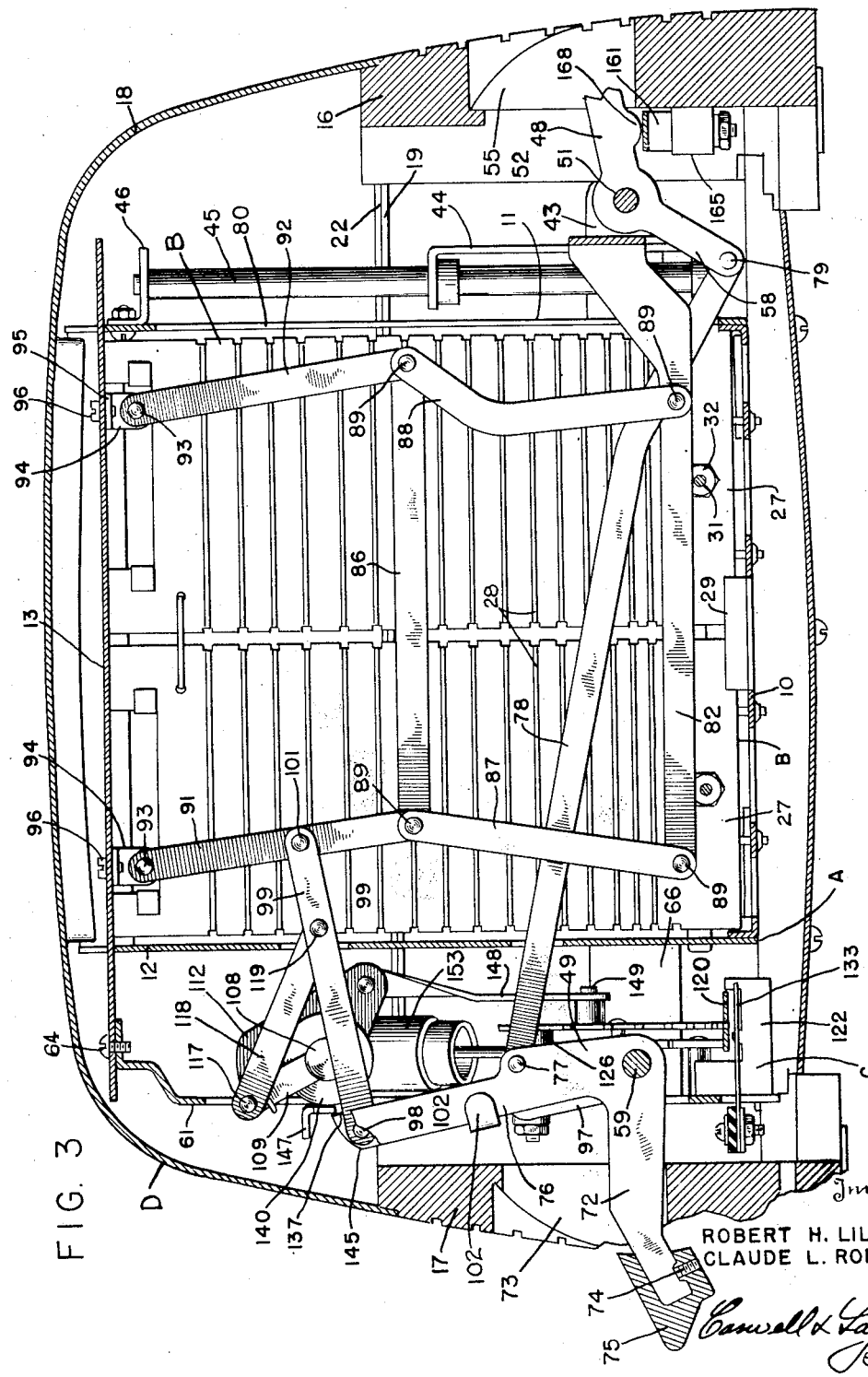
Fig. 3 is a view similar to Fig. 2 illustrating the parts in altered relation.
Figure 4:
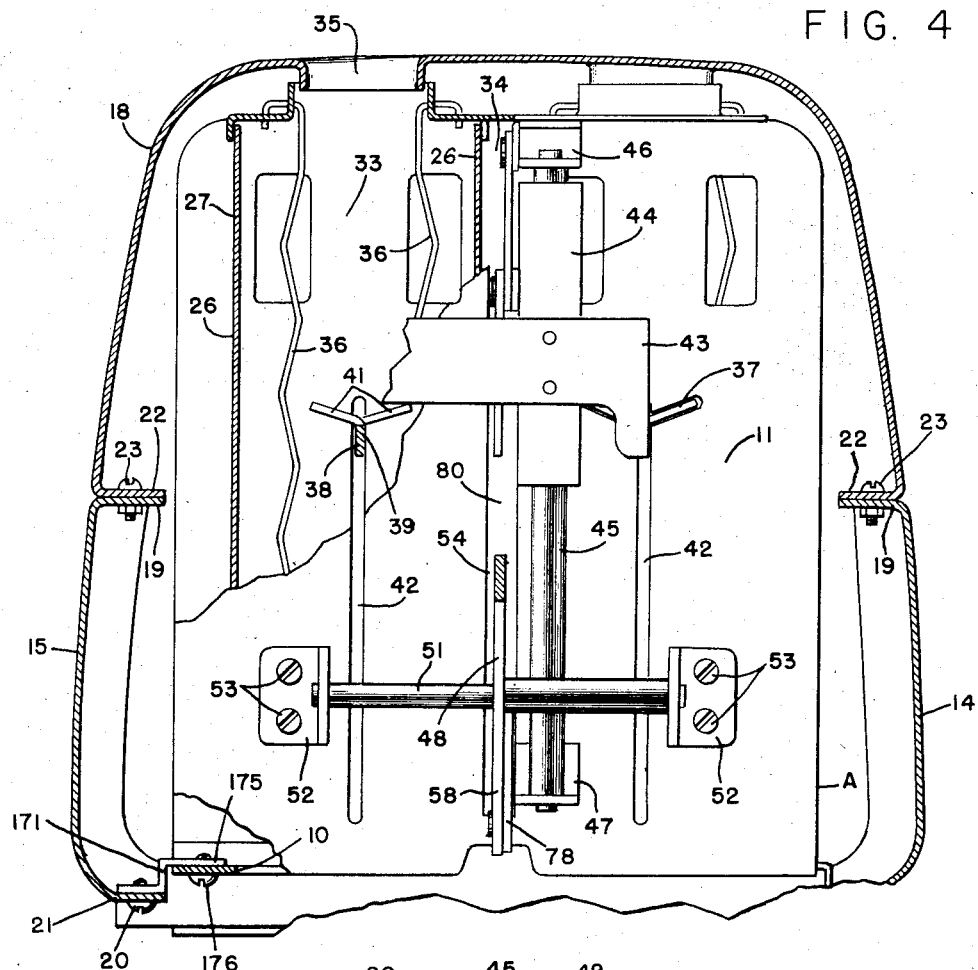
Fig. 4 is a fragmentary sectional elevational view taken on line 4—4 of Fig. 1.

The straight line motion 81 is operated by means of the arm 91. For this purpose, a lever 97 is employed which is rotatably mounted on the shaft 59 carrying the lever 49. The lever 97 has pivoted to it by means of a rivet 98, a link 99, This link is, in turn, pivoted by means of a rivet 101 to the arm 91 previously referred to. The arm 76 of lever 49 is adapted to operate the lever 97 by means of a lug 102 extending outwardly from the lever 97 and in the path of movement of the arm 76. It will thus be seen that by depressing either of the finger pieces 75 or 56 that the bread racks 37 and 38 are simultaneously moved from their uppermost positions to their lowermost positions as indicated in Figs. 2 and 3.

Figures 5, 7, 8:
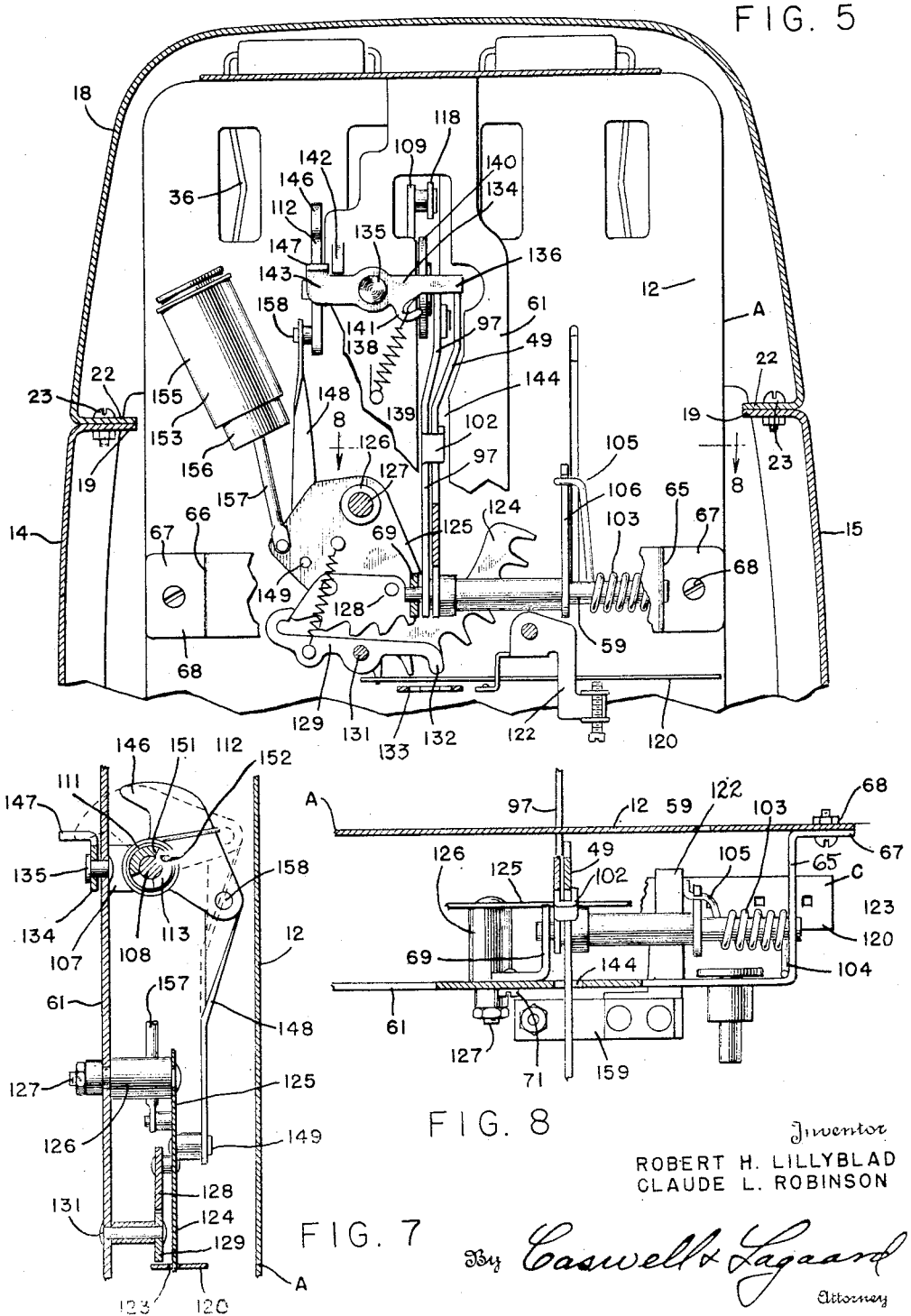
Fig. 5 is a view similar to Fig. 4 taken on line 5—5 of Fig. 1.
Fig. 7 is a fragmentary elevational sectional view taken on line 7—7 of Fig. 1.
Fig. 8 is a fragmentary plan sectional view taken on line 8—8 of Fig. 5.

The finger pieces 75 and 56 are urged upwardly by means of a torsion spring 103 best shown in Figs. 5 and 8. This spring encircles the shaft 59 and has one end 104 in engagement with the plate 61. The other end 105 of this spring is hooked about an arm 106 rigidly secured to the shaft 59. The spring 103 is so tensioned that the shaft 59 is urged to rotate in a clockwise direction as viewed in Fig. 2 thus urging both of the finger pieces 75 and 56 upwardly and also the bread racks 37 and 38 upwardly by means of link 99.

Formed on the plate 61 is a lug 107 which extends inwardly toward the end frame member 12. This lug has rigidly secured to it, a stub shaft 108. Mounted for rotation on this stub shaft is an arm 109 which has attached to it a hub 111. Another arm 112 is also mounted on said shaft and independently rotatable thereon. This arm is similarly attached to a hub 113 which rotates on the shaft 108. A torsional spring 114 encircles the two hubs 111 and 113 and has one end 115 engaging the arm 112 and the other end 116 engaging the arm 109. Arm 109 is pivoted by means of a rivet 117 to a link 118. This link is, in turn, pivoted by means of a rivet 119 to the link 99.

For determining the toasting period, a timing mechanism such as disclosed in the above mentioned patent is employed. This timing mechanism utilizes a strip of bi-metal 120 which is mounted for sliding movement in guides 121 and 122 carried by the plate 61. This strip of bi-metal is constructed with holes 123 arranged to form a rack which meshes with a gear segment 124 best shown in Fig. 5. The gear segment 124 is carried by a plate 125 which has attached to it a hub 126. Hub 126 is journaled for rotation on a stub shaft 127 which is attached to the plate 61. The plate 125 carries a ratchet 128 which engages a pawl 129 pivoted on a pintle 131 which is also attached to the plate 61. The pawl 129 has a finger 132 which rides upon the strip of bi-metal 120. A heater 133 disposed below the bi-metal 120 causes the same to arch and raise the finger 132. This releases the pawl 129 from engagement with one of the teeth of the ratchet 128. The segment 124 urged by spring 114 then causes the bi-metal to travel along the guides 121 and 122 until an unheated portion of the bi-metal is opposite the heater 133. Thus, the plate 125 is given a step by step movement depending upon the heating of successive portions of the strip of bi-metal.

In order to hold the bread racks 37 and 38 in position to cause toasting of the bread, a latch lever 134 is employed. This latch lever is pivoted by means of a rivet 135 to the plate 61 and has an arm 136 extending outwardly therefrom. Arm 136 rides on a roller 140 pivoted to the end of shaft 108. The upper end 137 of the lever 97 constitutes a catch which is adapted to engage the arm 136. A spring 138 hooked at one end on a pin 139 secured to plate 61 and hooked at its other end on a hook 141 formed on the lever 134 urges the said lever to move in a clockwise direction as viewed in Fig. 5. Movement of the said lever is terminated by means of a stop 142 formed on the plate 61 and engaging another arm 143 on said lever. The lever 49 and the lever 97 are operable through a slot 144 formed in the plate 61. When either of the finger pieces 75 or 56 are depressed, lever 49 is swung outwardly. This lever engages the lug 102 on lever 97 and forces the said lever outwardly. The catch 137 has a cam surface 145 which engages the arm 136 and raises the same against the action of the spring 138 to permit of moving the catch 137 in back of the said arm. This latches the lever 97 and holds the bread racks 37 and 38 depressed so that the bread resting thereon may be toasted.

For releasing the bread racks 37 and 38 upon completion of the toasting, the arm 112 is employed. This arm has a finger 146 which is adapted to engage a lug 147 bent outwardly from the arm 143 of lever 134. When the arm 112 is swung in a counter-clockwise direction as viewed in Fig. 2, the said finger engages lug 147 and releases the bread racks. Spring 103 then rotates shaft 59 and returns the parts to the position shown in Fig. 2. The arm 112 has connected to it a link 148 which, in turn, is connected to a stud 149 attached to plate 125. As the timing mechanism C operates, the plate 125 is moved in a clockwise direction as shown in Fig. 5 and the link 148 elevated. This swings the arm 112 from its full line position as shown in Fig. 7 to its dotted line position as previously described. For the purpose of resetting the timing mechanism, a shoulder 151 is formed on the hub 111 which is adapted to engage another shoulder 152 formed on the hub 113. When the spring 103 rotates shaft 59, the linkage connected to hub 111 is operated which rotates said hub in a clockwise direction as shown in Fig. 3. Shoulder 151 then drives hub 113 in the same direction and resets the timing mechanism.

Figure 6:
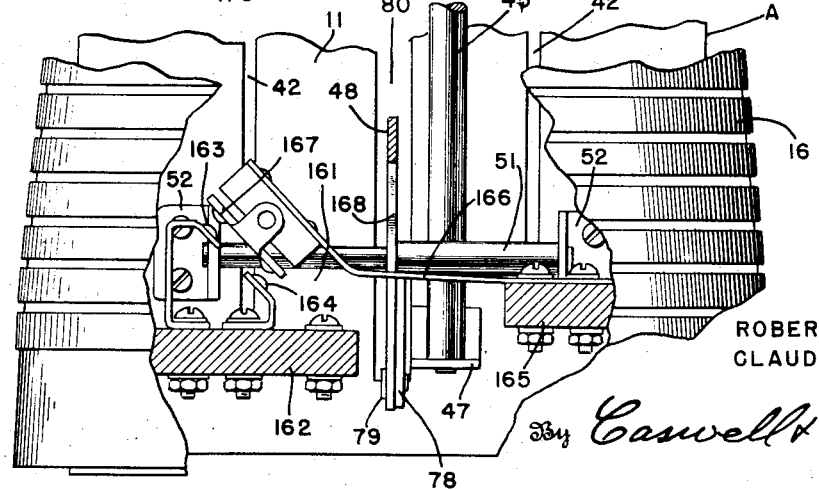
Fig. 6 is a fragmentary and elevational sectional view taken on line 6—6 of Fig. 1.

Energization of the heating elements 26 is procured through a heating circuit, not shown, which includes a switch 161. This switch is best shown in Fig. 6. Formed on the end case member 16 is a block of insulating material 162 which has attached to it, two contacts 163 and 164. Another block 165 of insulating material is formed on the said case member in spaced relation to the block 162 and carries a leaf spring 166. Attached to the leaf spring 166 is a jumper 167 which serves to close the heating circuit through the contacts 163 and 164. The switch 161 is actuated by means of the lever 49 which is formed with a cam 168 which engages the leaf spring 166 and depresses the same to bring the jumper 167 in contact with the contacts 163 and 164 when the finger pieces 56 or 75 are depressed.

In the particular form of the invention shown, a dash pot 153 is utilized which is mounted on the plate 61 by means of a bracket 154. This dash pot includes a cylinder 155 which has a piston 156 movable therein. Piston 156 has pivotally connected to it, a piston rod 157 which is, in turn, pivoted to the plate 125. This construction provides slow movement of the bread racks to ejecting position, thus preventing throwing of the bread out of the toaster and lessening the jar to the device.

The method of operation of the invention is as follows: Depressing finger piece 75 rotates lever 49 about shaft 59 in a counter-clockwise direction as viewed in Fig. 2 to the position shown in Fig. 3, carrying with it the arm 76. This arm bears against lug 102 causing arm 97 to move in unison with arm 49 about shaft 59. The movement of arm 97 is transmitted through link 99 to arm 91 causing said arm to rotate in a clockwise direction about rivet 93. This actuates the straight line motion 81 which, in turn, causes the bread racks 37 and 38 to be lowered to their lowermost position in the heating ovens. Link 99 being connected to arm 91, is correspondingly moved upon depression of the finger piece 75. Motion from this link is transmitted through the link 118 to the arm 109 causing said arm to move in a counter-clockwise direction about shaft 103. This tensions spring 114 urging arm 112 to move in a counter-clockwise direction. Arm 112 being connected by means of link 148 with the segment 124 urges the strip of bi-metal 120 to move through its supports 122 to procure timing of the toaster. The latch lever 134, when the finger 75 is sufficiently depressed, engages the catch 137 and holds the bread racks in lowered position. Lever 48 being connected to the lever 49 by means of link 78 is caused to move in a clockwise direction when lever 49 moves in a counter-clockwise direction. This causes the cam 160 to close the switch 161. As soon as the finger piece 75 is released, the timing mechanism functions and toasting commences. When the strip of bi-metal 120 has transversed its course, the finger 146 on arm 112 engages the latch lever 134 and releases the bread racks. Spring 103 now returns the bread racks to normal position and resets the timing mechanism. At the same time, the switch 161 is opened. If, instead of depressing the finger piece 75, the finger piece 56 is depressed, lever 48 is rotated in a clockwise direction as shown in Fig. 2 to the position shown in Fig. 3. Lever 48 being connected to lever 49 by link 78 causes movement of the lever 49 to the same position as it would have moved had the finger piece 75 been depressed. The mechanism connected with lever 49 is then operated in the same manner as previously described.

The advantages of the invention are manifest. By means of the instant invention, the toaster can be operated from either end of the case and the finger pieces serving to operate the toaster also serve as handles for carrying the same about. With the present construction, most of the parts are pivotally mounted so that friction due to sliding is greatly reduced thereby providing a construction which will operate indefinitely without attention. The operating parts of the mechanism for lowering the toast from either finger piece is confined within the space between the innermost heaters so that the toaster does not need to be increased in size. Construction of our toaster is such that heating of the parts does not affect the operation of the same.

Changes in the specific form of our invention, as herein described, may be made within the scope of what is claimed without departing from the spirit of our invention.

Having described our invention, what we claim as new and desire to protect by Letters Patent is:

1. In a bread toaster, a frame, heating means within said frame, a bread rack, guide means for guiding said bread rack for movement relative to the heating means, a pair of arms pivoted to said frame and spaced from one another, a floating link between said arms connected at one end to one arm and at its other end to the other arm, a second pair of arms pivoted to said floating link and to said first named arms, a bar connected to said rack, said second-named arms being pivoted to said bar, a movable finger piece and linkage between said finger piece and one of said arms for swinging the same to procure movement of the bread rack.

2. In a bread toaster a frame, having a top plate, heating means within said frame, a bread rack, guide means for guiding said bread rack for movement relative to the heating means and in a substantially vertical direction, depending arms located at opposite ends of said frame and pivoted to said top plate, a floating link pivoted at its ends to the lower ends of said arms, other depending arms pivoted to the lower ends of said first named arms, a bar disposed below said floating link and attached to said bread rack, said second named depending arms being pivoted to said bar by means of pivots having their axes fixed relative to said bar, and linkage connected to one of said depending arms and including a lever having a finger piece for manual manipulation to swing said arms and move said bread racks.

3. In a bread toaster a frame, having a top plate, heating means within said frame, a bread rack, guide means for guiding said bread rack for movement relative to the heating means and in a substantially vertical direction, depending arms located at opposite ends of said frame and pivoted to said top plate, a floating link pivoted at its ends to the lower ends of said arms, other depending arms pivoted to the lower ends of said first named arms, a bar disposed below said floating link and attached to said bread rack, said second named depending arms being pivoted to said bar by means of pivots having their axes fixed relative to said bar, and linkage including an actuating link connected to one of said depending arms at a locality intermediate its ends, said linkage including a lever having a part connected to said actuating link and having a finger piece for manual manipulation to swing said arms and move said bread rack.

4. In a bread toaster a frame, two outer and two intermediate vertical plate like heating elements arranged in substantially parallel spaced relation within said frame to form outer toasting chambers and an inner chamber, bread racks in said toasting chambers, guide means for guiding said bread racks for up and down movement, depending arms located at opposite ends of said frame and pivoted at their upper ends to the upper portion of said frame, a floating link pivoted at its ends to the lower ends of said depending arms, other depending arms pivoted to the lower ends of said first named depending arms, a bar disposed beneath said floating link and connected to said bread racks, said second named depending arms being pivoted at their lower ends to said bar, said depending arms, floating link and bar being all confined to said inner chamber, levers disposed at opposite ends of said frame and lying substantially parallel to said depending arms, said levers having arms extending outwardly beyond the ends of said frame, finger pieces on said last named arms for manual manipulation of said levers, one of said levers having an arm extending upwardly therefrom, the other of said levers including an arm extending downwardly therefrom, a link connecting said arms and extending through said inner chamber, and connecting means between one of said levers and one of said depending arms.

5. In a bread toaster a frame, two outer and two intermediate vertical plate like heating elements arranged in substantially parallel spaced relation within said frame to form outer toasting chambers and an inner chamber, bread racks in said toasting chambers, guide means for guiding said bread racks for up and down movement, levers disposed at opposite ends of said frame and extending outwardly beyond said frame at its ends, said levers moving in a plane substantially parallel with the planes of the inner heating elements, finger pieces on said levers for manually manipulating the same, linkage disposed within said inner chamber and connected to said bread racks, means extending into said inner chamber for connecting said levers to move in unison and means connecting one of said levers to said linkage.

6. In a bread toaster, a frame, heating means within said frame, a bread rack, guide means for guiding said bread rack for movement relative to the heating means, a lever at one end of the frame having an upwardly extending arm, a lever at the other end of the frame having a downwardly extending arm, said arms lying substantially in a common plane and the ends of said arms being spaced from one another, a link pivotally connected to one of said arms at one end and to the other arm at its other end and mechanism between one of said levers and said rack for causing movement of the rack upon movement of either of said levers.

7. In a bread toaster, a frame, heating means within said frame, a bread rack, guide means for guiding said bread rack for movement relative to the heating means, a pair of depending arms pivoted to said frame at the upper portion of the same, a floating link between said arms connected at one end to one arm and at its other end to the other arm, means for connecting said floating link to said bread rack, a movable finger piece at the lower portion of the frame and linkage between said finger piece and one of said arms for swinging the same to procure movement of the bread rack.

8. In a bread toaster, a frame, heating means within said frame, a bread rack, guide means for guiding said bread rack for movement relative to the heating means, a pair of arms pivoted to said frame, a floating link between said arms and connected thereto at its ends, a second pair of arms pivoted to said floating link at the same locality as the first named arms and movable relative to said first named arms, said second named arms being connected to said bread rack through pivots whose axes are fixed relative to said bread rack, a movable finger piece and linkage between said finger piece and one of said arms for swinging the same to procure movement of the bread rack.

ROBERT H. LILLYBLAD.
CLAUDE L. ROBINSON.

REFERENCES CITED

The following references are of record in the file of this patent:

UNITED STATES PATENTS

| Number | Name | Date |
|---|---|---|
| 1,666,912 | Pritchard | Apr. 24, 1928 |
| 2,106,824 | Bayne | Feb. 1, 1938 |
| 2,147,388 | Serota | Feb. 14, 1939 |
| 2,171,897 | Sardeson | Sept. 5, 1939 |
| 2,266,045 | Ireland | Dec. 16, 1941 |
| 2,288,748 | Scharf | July 7, 1942 |
| 2,336,640 | Sardeson | Dec. 14, 1943 |
| 2,355,153 | Gomersall | Aug. 8, 1944 |
| 2,389,927 | Parr | Nov. 27, 1945 |